March 11, 1952  J. E. ENGLESSON  2,588,371
COMBINED PROPELLER PITCH AND ENGINE SPEED CONTROL DEVICE
Filed Jan. 9, 1946  3 Sheets-Sheet 1

Inventor:
John Elov Englesson
Attorney.
W. Bayard Jones

March 11, 1952   J. E. ENGLESSON   2,588,371
COMBINED PROPELLER PITCH AND ENGINE SPEED CONTROL DEVICE
Filed Jan. 9, 1946   3 Sheets-Sheet 2
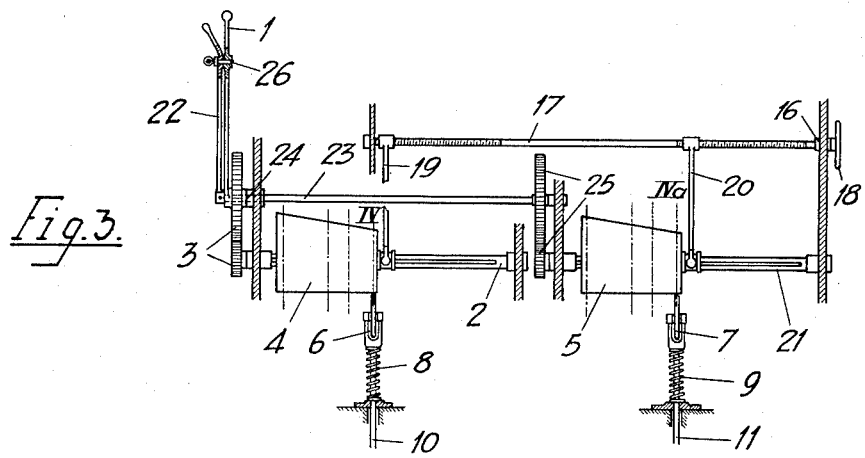
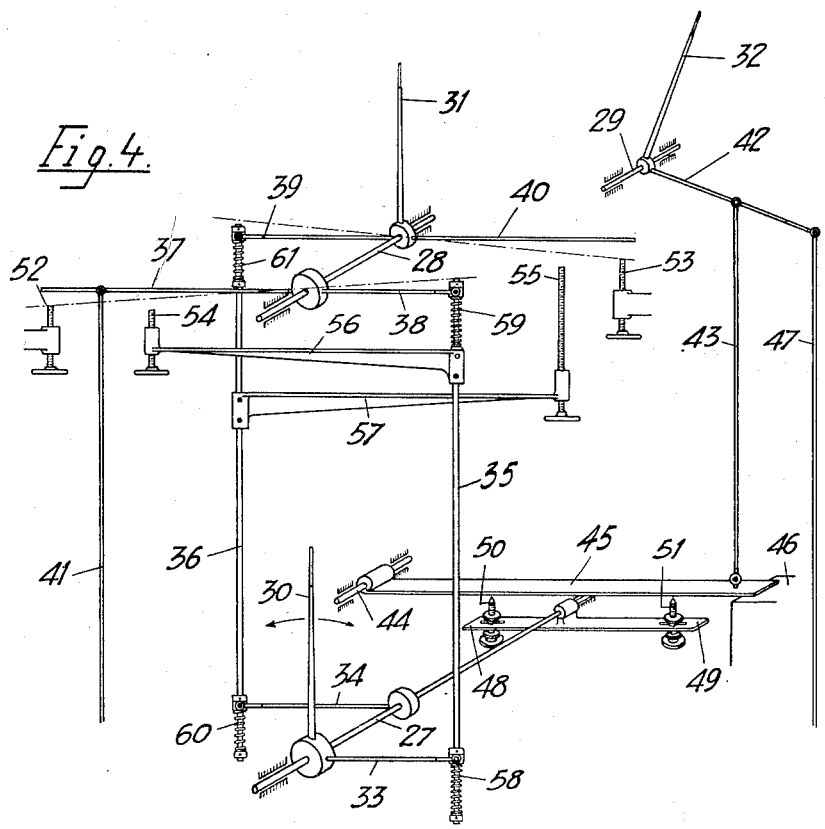
Inventor:
John Elov Englesson
Attorney: W. Bayard Jones

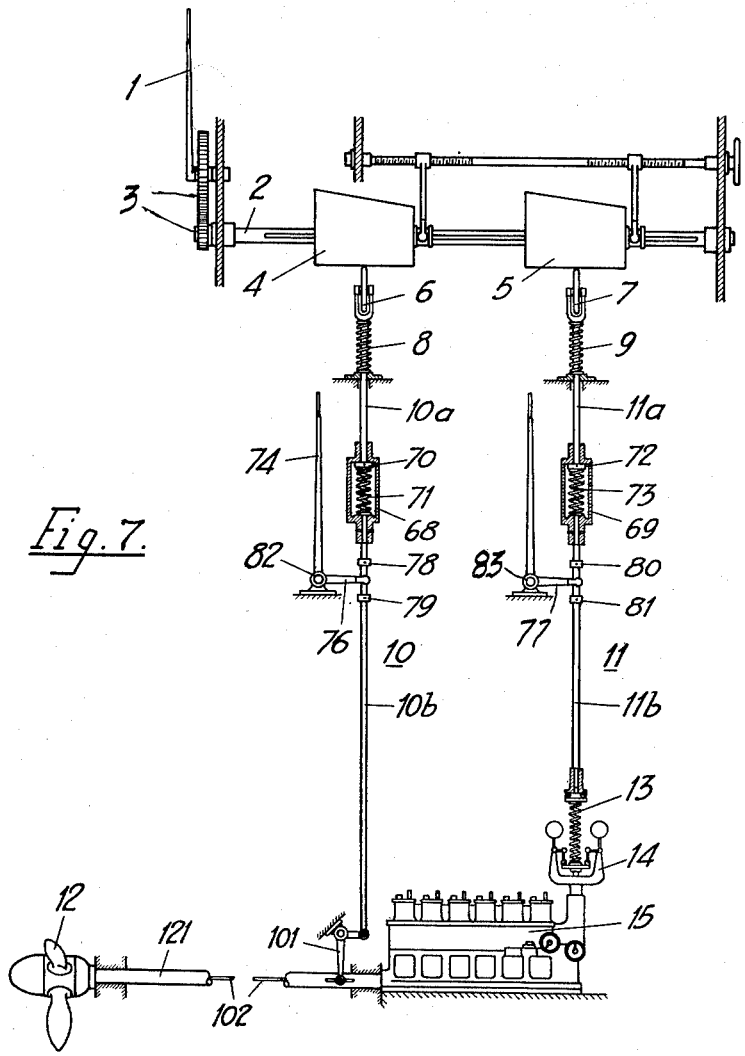

Patented Mar. 11, 1952

2,588,371

UNITED STATES PATENT OFFICE 2,588,371

COMBINED PROPELLER PITCH AND ENGINE SPEED CONTROL DEVICE

John Elov Englesson, Kristinehamn, Sweden

Application January 9, 1946, Serial No. 639,936
In Sweden January 15, 1945

12 Claims. (Cl. 170—135.74)

The present invention relates to a combined propeller pitch and engine speed control device. In a ship which is provided with a propeller having adjustable blades, all operations are as a rule controlled from the bridge without the aid of the engine room crew. In order to obtain the best possible efficiency of the entire driving machinery, that is to say, of the combination of driving engine and propeller, it is not sufficient merely to adjust the pitch of the propeller, since for each adjusted propeller pitch it is also necessary to regulate the speed of the driving engine, and thus of the propeller, to a certain corresponding number of revolutions.

It is the purpose of the present invention to provide a combined propeller pitch and engine speed control device which will enable the captain of the ship easily and speedily and by means of a single operating device to control and adjust the pitch of the propeller as well as the speed of the engine in such manner that in all positions of control the propeller pitch and the speed of the engine are correctly related to one another.

With this purpose in view the combined propeller pitch and engine speed control device according to the present invention comprises a pitch-varying mechanism for effecting adjustment of the pitch of the propeller blades, and adjustable centrifugal speed governor controlling the speed of the engine, a propeller pitch adjustment means associated with the pitch varying mechanism and adapted to positively actuate said mechanism in accordance with a predetermined course of control operations, an engine speed adjustment means associated with the centrifugal speed governor and adapted to positively actuate said governor in accordance with a second predetermined course of control operations, an operating device, and means operatively connecting said operating device to each of said adjustment means, whereby said adjustment means may be operated simultaneously by means of said operating device.

Figure 1:
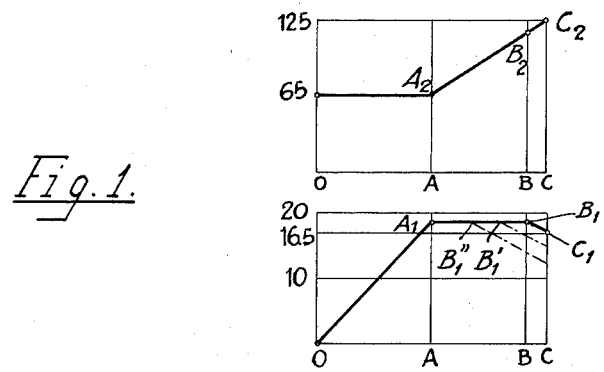
Figure 2:
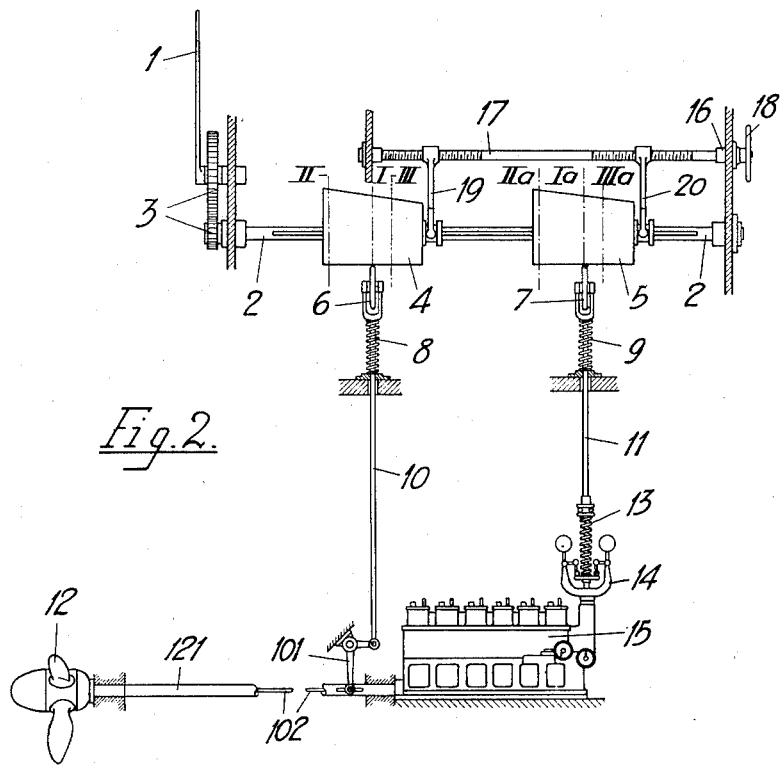

In the accompanying drawings, Fig. 1 is a diagram that illustrates the function of the device according to the present invention and the manner in which the propeller pitch and the engine speed are controlled in the case when the driving engine is a diesel engine. Fig. 2 illustrates, diagrammatically a constructional form of the device according to the invention in which the adjustment means for the pitch-varying mechanism and for the centrifugal speed governor consist of roller-shaped rotatable curve bodies which are mounted on a common shaft, and Fig. 3 shows, also diagrammatically, a second constructional form in which the said bodies are mounted on separate shafts. Fig. 4 illustrates diagrammatically a constructional form of the invention in which the adjustment means for the pitch-varying mechanism and for the centrifugal governor consist of lever systems. Figs. 5 and 6 show diagrams of the variation of the propeller pitch and of the engine speed, respectively, corresponding to those shown in Fig. 1. Fig. 7 shows diagrammatically a further constructional form which differs from that shown in Fig. 2, by the provision of auxiliary operating devices for independent actuation of the pitch-varying mechanism and of the centrifugal governor.

Referring to the drawings, Fig. 1 illustrates diagrammatically the manner in which the pitch of the propeller and the number of revolutions per minute thereof should preferably be regulated with respect to one another when the driving engine is a diesel engine. The upper curve indicates the variation of the number of revolutions per minute, while the lower curve indicates the variation of the propeller pitch, both being plotted against the speed of the ship, from zero speed thereof to full speed ahead or astern. At speeds between no speed and the speed A the driving engine should all the time run at the lowest number of revolutions per minute at which the engine can operate, for instance, a speed of 65 revolutions per minute. During this period the speed of the ship is controlled by varying the pitch of the propeller which is increased continuously, as illustrated in the diagram, from zero pitch up to a certain pitch $A_1$ at which the total efficiency of the engine and of the propeller, becomes the maximum. This pitch $A_1$ lies, for instance, at 18, which is slightly greater than that pitch 16.5 at which the propeller in question is intended to be used at full speed ahead. The numbers on the scale of pitch are arbitrarily selected and extend from zero up to 20. Zero pitch indicates the pitch when the propeller is running idle. At speeds of the ship between the points A and B, this propeller pitch 18 between points $A_1$ and $B_1$ is maintained constant, and the speed of the ship is controlled by varying the speed of the engine from $A_2$ to $B_2$. When the engine speed reaches the point $B_2$, the average pressure in the engine cylinders have reached the highest permissible value at normal operation. It is necessary, therefore, again to reduce the propeller pitch in order to reach the highest normal engine speed $C_2$, for instance 125 revolutions per minute, at which the engine delivers its normal full output. Between the points B and C on the speed line of the ship it is thus necessary to change both the engine speed from $B_2$ to $C_2$ and the propeller pitch from $B_1$ to $C_1$. If it is desired to run the ship at forced speed without increasing the average pressure in the engine, it is merely necessary to continue the regulation in such manner that the engine speed is further increased and the propeller pitch is reduced, so that the average pressure in the engine is maintained.

In the constructional form illustrated in Fig. 2 there is provided an operating lever 1, which is assumed to be placed on the bridge of the ship, and by means of which a shaft 2, which is journalled in fixed bearings, may be rotated in one direction or the other. Transmission of movement from the lever 1 to the shaft 2 is effected, in the instance illustrated, by means of a toothed gearing 3, but may of course be effected by means of any other suitable device. Two roller-shaped curve bodies 4 and 5 are provided on the shaft 2 in such manner that they may be displaced on the shaft but cannot be rotated relatively to the same. The curve bodies 4 and 5 serve to actuate rollers 6 and 7, respectively, which are held against the surfaces of said bodies by springs 8 and 9, respectively, and which are rotatably journalled at the ends of the rods 10 and 11, respectively, which are slidably supported in fixed bearings in such manner that they may be displaced in a direction perpendicular to the shaft 2. The rod 10 serves to operate the control means which, in a manner known per se, controls the mechanism, which is not shown in the drawing, for adjusting the adjustable propeller blades 12, and is connected to such control means in any suitable manner, diagrammatically illustrated as a bell crank lever 101 and a rod 102 slidable in the propeller shaft 121. The rod 11 actuates the spring 13 of a centrifugal governor 14 for the propeller driving engine 15, which may be assumed, for instance, to be a diesel engine.

For effecting a displacement of the curve bodies 4 and 5 on the shaft 2 there is provided a screw-threaded spindle 17, which is rotatably journalled in a bearing 16, and which extends parallel to the shaft 2 and may be rotated by means of a handwheel 18. Provided on the spindle 17 are two arms 19 and 20 having female screw threads engaging the threads on the spindle. Said arms engage grooves provided in the bodies 4 and 5 so that the latter will be displaced on the shaft 2 when the spindle 17 is rotated. The screw-threads on the spindle 17 and in the two arms 19 and 20 may be made in such manner, as in the instance illustrated, that upon rotation of the spindle the two bodies 4 and 5 are moved in the same direction, so that the distance between said bodies remains unchanged.

The two curve bodies 4 and 5, which constitute the abovementioned adjustment members for varying the pitch of the propeller blades 12 and for varying the speed of the engine 15, respectively, and which are connected to the common operating lever 1, are shaped in such manner that their surfaces form a plurality of peripheral curve paths, all of which have such shapes that the rods 10 and 11 are displaced longitudinally when the bodies 4 and 5 are rotated by means of the lever 1. By making these curve paths of suitable shapes it is thus possible to effect the desired variation of the pitch of the propeller blades and of the speed of the engine, for instance in accordance with the curves shown in Fig. 1. The two bodies are also shaped in such manner that each curve path on the body 4 corresponds to a certain curve path on the body 5. Dot and dash lines in Fig. 2 indicate three such curve paths on each body, namely the curve paths I, II and III on the body 4, and the corresponding curve paths I$a$, II$a$ and III$a$ on the body 5. These curve paths are located at correspondingly equal distances in the axial direction, in such manner that when the roller 6 runs on the path I on the roller 4, the roller 7 runs on the corresponding path I$a$ on the body 5, and so forth. By operating the lever 1 on the bridge the captain of the ship can thus automatically effect that change of the propeller pitch and of the engine speed that is most suited to meet the sailing conditions in each particular case, and therefore, he does not have to think about in what manner the propeller pitch and the engine speed should be regulated relatively to one another on each particular occasion.

If the sailing conditions, such as the resistance of the water or of the air, undergo a change, it is easy with the aid of the regulating means above described to meet such change. For this purpose it is only necessary to turn the handwheel 18 so as to displace the two curve bodies 4 and 5 in the axial direction, in such manner that another pair of curve paths, for instance the paths II and II$a$, which are suited to the changed conditions, are moved into operative positions and actuate the rollers 6 and 7. These curve paths will then determine the variation of the propeller pitch and of the engine speed that is most suited to the changed sailing conditions.

The two adjustment members 4, 5 and the members directly actuated by the same, may suitably be located in the engine room of the ship, or in some other suitable room where they are accessible to the engine crew for adjustment and inspection.

If for some reason it is desirable not to operate the driving machinery in such manner that the change of the propeller pitch and the change of the engine speed stand in a certain predetermined relation to one another, it is obviously necessary to provide means for varying the pitch and the engine speed at will. To this end the constructional form illustrated in Fig. 2 may be modified in the manner illustrated in Fig. 3. This constructional form is substantially similar to that shown in Fig. 2, except that the two curve bodies 4 and 5 are arranged in such manner that they may be rotated either each by itself, or both together, as according to Fig. 2. For this purpose the curve body 5 for changing the engine speed is mounted on a separate shaft 21, which is journalled coaxially with the shaft 2, and which is adapted to be rotated separately by means of a hand-lever 22, a shaft 23 which is journalled in the tubular shaft 24 of the lever 1, and a toothed gearing 25. The two levers 22 and 1 may be connected to one another by means of a pin 26 which may be inserted through holes in the levers. In other respects the same reference numerals are used in Fig. 3 as in Fig. 2 to denote similar parts. In the constructional form shown in Fig. 3, the two curve bodies 4 and 5 are each provided with a curve path of a particular shape. Said curve paths are indicated by the dot and dash lines IV and IV$a$ respectively. The curve path IV on the body 4 for varying the propeller pitch may suitably be shaped in such manner that, for instance, said pitch is changed continuously from zero to a maximum for running ahead when the lever 1 is moved from its middle position to the position full speed ahead, and from zero to a maximum for running astern when the lever 1 is moved from its middle position to the position full speed astern. The curve path IVa on the body 5 for varying the engine speed may then suitably be shaped in such manner that the engine runs at its lowest possible speed when the lever 22 is moved farthest astern, and at its highest permissible speed when the lever 22 is moved farthest ahead.

When it is desired to vary the propeller pitch and the engine speed independently of one another, the curve bodies 4 and 5 are thus displaced by means of the handwheel 18, spindle 17 and arms 19 and 20 to the left to the positions shown in Fig. 3, in which the rollers 6 and 7 run on the curve paths IV and IVa, respectively, after which the pin 26 is removed, so that the two levers 1 and 22 are free from one another. The propeller pitch may then be varied independently by means of the lever 1, and the engine speed may be varied independently by means of the lever 22.

Fig. 4 illustrates a further constructional form of the invention in which the curve bodies 4 and 5 above described are replaced by lever systems. In this constructional form there are provided three parallel shafts 27, 28 and 29, which are journalled in fixed bearings, and each of which is provided with an operating lever 30, 31 and 32, respectively, by means of which the shafts may be turned in one direction or the other. The lever 30 serves for simultaneous regulation of the propeller pitch and of the engine speed, while the lever 31 serves for separate adjustment of the propeller pitch, and the lever 32 serves for separate control of the engine speed. Secured to the shaft 27 are two levers 33 and 34, the former of which is connected through a resilient connecting rod 35 with a two-armed lever 38, 37 secured to the shaft 28. The lever 34 is connected by means of a similar resilient connecting rod 36 with a second two-armed lever 39, 40 secured to the shaft 28. The lever arm 37 is connected through a rod 41, which corresponds to the rod 10 in Fig. 2, to the control means that controls the pitch-varying mechanism for the adjustable propeller blades. Secured to the shaft 29 is a lever 42 which is connected through a rod 43 with a lever 45 which is pivoted on a shaft 44 and the free end of which normally bears against a fixed abutment 46. The lever 42 is also connected through a rod 47, which corresponds to the rod 11 in Fig. 2, with the centrifugal governor for the engine driving the propeller. Secured to the shaft 27 below the lever 45 is a two-armed lever 48, 49 in the free ends of which adjustment screws 50 and 51 are screwed, so that the height of the points of said screws above the shaft 27 may be adjusted. For limiting the downward movement of the lever 37, there is also provided an adjustable stop in the form of an adjustment screw 52, and a similar adjustment screw 53 serves to limit the downward movement of the lever 40. Finally, the connecting rod 35 is also provided with an adjustable stop for the lever 37 in the form of an adjustment screw 54 which is screwed into an arm 56 projecting laterally from the said rod, and the connecting rod 36 is provided with an adjustable stop for the lever 40 in the form of an adjustment screw 55 which is screwed into an arm 57 projecting laterally from the said connecting rod. The resilient connection of the lever arms 33 and 38 with the connecting rod 35 is indicated in the drawing by long compression springs 58 and 59, and the resilient connection of the lever arms 34 and 39 with the connecting rod 36 is indicated by similar compression springs 60 and 61. All of these compression springs are arranged in such manner that they exert upward pressure on the lever arms.

In correspondence to the curves indicating the variation of propeller pitch and of engine speed shown in Fig. 1, there are shown in Figs. 5 and 6 in a slightly different manner curves showing the change of propeller pitch and of engine speed, respectively. These curves are applicable both when the engine consists of a steam engine and when it consists of a diesel engine. Fig. 5 illustrates the variations of the propeller pitch when the ship is going ahead as well as astern, and Fig. 6 illustrates in a similar manner the variation of the engine speed.

The apparatus illustrated in Fig. 4 functions in the following manner when the ship is running ahead. When the lever 30 is moved to the left in Fig. 4, the lever arm 33 and the connecting rod 35 move upwards, and through the intermediary of the spring 59 the latter moves the lever 38 upwards. The shaft 28 is thus turned in the counter-clockwise direction, so that the lever 37 swings downwards and actuates, through the intermediary of the rod 41, the control means that regulates the propeller pitch, so that said pitch is continuously increased, from the point $B_3$ to the point $A_3$ in Fig. 5. This increase of the pitch continues until the lever 37 comes to bear against the stop 52. The connecting rod 35 continues its upward movement, however, while compressing the spring 59. During this part of the movement, which corresponds to the line $A_3$—$B_3$ in Fig. 5, the pitch remains unchanged. This condition lasts until the adjustment screw 54 strikes against the lever arm 37 and compels the latter again to move upwards, while the spring 59 is further compressed, which movement results in the control means for the pitch-varying mechanism being reversed, so that the pitch is again decreased, from point $B_3$ to point $C_3$ in Fig. 5. As regards that portion of the apparatus which effects variation of the speed of the engine, the adjustment screw 51 in the lever arm 49 is adjusted in such manner that it strikes against the lever arm 45 and begins to swing the latter upwards only when the downward movement of the lever arm 37 is stopped by the stop 52. Therefore, the engine speed remains unchanged from point $B_4$ to point $A_4$ in Fig. 6, but is afterwards increased continuously from point $A_4$ to point $B_4$, due to the lever arm 45 swinging upwards and raising, through the intermediary of the rod 43 and the lever arm 42, the rod 47 the upward movement of which effects an increase of the engine speed. The increase of the engine speed may then be continued from point $B_4$ to point $C_4$.

In the event that it is desired to vary the position of the point $B_3$ in Fig. 5 in order to change the point at which the reduction of the pitch is initiated, or if it is desired to change the angle α in Fig. 6 in order to cause the variation of the engine speed to take place at a more rapid rate or at a slower rate than that corresponding to the inclination of the line $A_4$—$B_4$ in Fig. 6, this object can be attained by constructing the apparatus illustrated in Fig. 4 in such manner that the stops 54 and 55 are adjustable in the longitudinal directions of the arms 56 and 57, respectively, and the stops 50 and 51 are adjustable in the longitudinal direction of the lever arms 48 and 49, respectively. Means allowing such adjustment are well known in the art and need not, therefore, be further described.

The apparatus functions in an analogous manner when the ship is moving astern for which purpose the lever 30 is moved to the right in Fig. 4. The main differences consist in that in this case the connecting rod 36 is caused to function instead of the rod 35, the stop 53 for the lever 40 instead of the stop 52 for the lever 37, and the stop 55 instead of the stop 54. The variation of the engine speed is effected in the same manner as when the ship is moving ahead, with the difference only that in this case the adjustment screw 50 will strike against the lever 45 and swing it upwards.

The regulating means according to the present invention possesses a further advantage which is of great practical importance. When the engine is running at a high speed, and it is desired to reduce the speed of the ship, and when for this purpose the propeller pitch is reduced, the governor of the engine is also actuated so that the engine speed is also reduced. In this way the engine is prevented from racing, which will otherwise easily happen if the propeller pitch only is rapidly reduced, due to the fact that propelling engines for ships have a comparatively small flywheel mass.

With the regulating means above described with reference to Figs. 2 and 3, however, the commander of the ship cannot influence the engine speed and/or the propeller pitch in other manner than that permitted by the curve bodies 4 and 5. On certain occasions, however, as for instance when breaking ice, it may be advantageous to run the engine all the time at full normal speed or even at overspeed, in order to make it possible quickly to put full load or overload on the engine, and on the other hand, when a ship carries no load it may be advantageous at a somewhat reduced speed of the ship to use a greater propeller pitch than when the ship carries full load.

The present invention, therefore, comprises a further improvement which renders its possible to effect such variations of the regulation. This further improvement is mainly characterized by the fact the association with the motion transmitting elements, such as rods 10 and 11, in Fig. 2, of auxiliary adjustment and operating devices for actuating the propeller pitch and engine control means independently of the adjustment members, such as the curve bodies 4 and 5 of Fig. 2. For the purpose of rendering it possible to vary the adjustment of the propeller pitch and of the speed of the engine independently of the position of the abovementioned adjustment members, i. e. the curve bodies, a resilient connection is preferably inserted in each of the said motion transmitting devices between the respective adjustment member and that point at which the aforesaid auxiliary operating device is associated with such transmitting device.

The abovementioned improvements are embodied in the constructional form of the invention which is illustrated diagrammatically in Fig. 7. In other respects this constructional form is substantially similar to that illustrated in Fig. 2, and similar reference numerals are used to denote similar parts. Fig. 7 shows an operating lever 1 which may be placed on the bridge of the ship, and by the aid of which and through the intermediary of a toothed gearing 3, a shaft 2 rotatably journalled in fixed bearings may be rotated in one direction or the other. Mounted on the said shaft 2 are two roller-shaped curve bodies 4 and 5 in such manner that they are displaceable on the shaft but not rotatable relatively to the same. The curve bodies 4 and 5 serve to actuate rollers 6 and 7, respectively, which are held by springs 8 and 9, respectively, against the surfaces of the bodies, and which are journalled at the ends of rods 10 and 11, which are slidable in fixed bearings so that they are movable in a direction perpendicular to the shaft 2. The rod 10 actuated by the curve body 4 is connected to and serves to actuate the control means which, in a manner known per se, serves to control the pitch-varying mechanism, not shown in the drawing, for the adjustable propeller blades 12, and the rod 11 actuated by the curve body 5 actuates the spring 13 of a centrifugal governor 14 for the engine 15 driving the propeller, which engine may, for instance, be a diesel engine. The two curve bodies 4 and 5, which constitute the abovementioned adjustment members for varying the pitch of the propeller blades 12 and for controlling the speed of the driving engine 15, respectively, and which are connected to the common operating lever 1, are shaped in such manner that their surfaces form a plurality of peripheral curve paths having such shape that the rods 10 and 11 actuated by the same are displaced in their longitudinal directions when the bodies 4 and 5 are rotated by means of the lever 1. By shaping these curve paths in suitable manner it is thus possible to produce certain desired variations of the pitch of the propeller blades and of the speed of the engine, as described in detail here above.

In order to enable the captain to regulate the propeller pitch and the engine speed also in another manner than that produced by the said curve paths on the curve bodies, the two abovementioned displaceable rods 10 and 11, which are actuated by the curve bodies 4 and 5, are each divided in two portions or members 10a and 10b, and 11a and 11b, respectively, which portions are aligned with one another. Between the two portions of each rod there is interposed a resilient connection which permits actuating of the con-control means for the pitch-varying mechanism for the propeller blades 12 independently of the position of the curve body 4, and actuation of the centrifugal governor 14 of the engine 15 independently of the position of the curve body 5. Associated with the rod member 10b is an auxiliary operating device in the form of a lever 74 for actuating the control means for the pitch-varying mechanism for the propeller blades 12 independently of the curve body 4, and associated with the rod member 11b is a second auxiliary operating device in the form of a lever 75 for actuating the centrifugal regulator 14 independently of the curve body 5.

In the instance illustrated, the resilient connection between the rod members 10a and 10b consists of a sleeve 68 which is rigidly attached to the lower rod member 10b, while the upper rod member 10a is slidable through the upper end of said sleeve 68. Upward movement of the rod member 10a in the sleeve 68 is limited by a stop 70 on the lower end of the rod member. Interposed between the said stop 70 and the lower end of the sleeve 68 is a strong spring 71 which normally maintains the stop against the upper end of the sleeve. The spring 71 is stronger than the spring 8 which in its turn is strong enough to overcome frictional resistance offered by the control means for the pitch-varying mechanism for the propeller blades when moved, and in view hereof the rod portions 10a and 10b act as a single rod and transmit the regulation impulses from the curve body 4 to the said control means.

In a similar manner the resilient connection interposed between the rod members 11a and 11b consists of a sleeve 69 which is rigidly attached to the lower rod member 11b, while the upper rod member 11a is slidable in the sleeve, its upward movement relatively to the sleeve being limited by a stop 72 which is normally forced against the upper end of the sleeve by the spring 73. Also the two rod members 11a and 11b operate as a single rod and transmit the regulation impulses from the curve body 5 to the centrifugal governor 14. The operating device 74 is shown as consisting of a bell crank lever pivoted on the pin 82, and the short arm 76 of which projects between two stops 78 and 79 on the rod member 10b. In a similar manner the operating device 75 is shown as consisting of a bell crank lever pivoted on the pin 83, and the short arm 77 of which projects between two stops 80 and 81 on the rod member 11b.

It will be easily understood that by the aid of the said levers 74 and 75 the captain can regulate the propeller pitch and the engine speed independently of the curve bodies 4 and 5. When the levers 74 and 75 are moved to the left or to the right, as viewed in the drawing, they move the rod members 10b and 11b in the upward or downward direction, respectively, so that the control means for the pitch-varying mechanism for the adjustable propeller blades 12 and the centrifugal governor 14 are actuated. On the other hand, movement of the levers 74 and 75 to the left, from their middle positions shown in the drawing, produces no displacement of the rod members 10a and 11a, provided that the rollers 6 and 7 are contacting with the curve bodies 4 and 5, respectively. Such movement to the left of the levers merely results in the sleeves 68 and 69 sliding upwards on the rod members 10a and 11a while compressing the springs 71 and 73. When the levers 74 and 75 are moved to the right from the zero position shown in the drawing, however, the rod members 10a and 11a are moved downwards by the stops 70 and 72, respectively, so that the rollers 6 and 7 are moved away from the curve bodies 4 and 5, respectively, while the springs 8 and 9 are compressed. When the levers 74 and 75 occupy their normal zero positions, as shown in the drawing, regulation of the propeller pitch and of the speed of the engine is effected by rotation of the curve bodies 4 and 5 in the same manner as previously described in connection with Fig. 2.

The constructional forms above described and illustrated in the drawings are only to be regarded as examples, and the details thereof may, of course, be modified in several ways without departing from the principle of the invention.

I claim:

1. Means for regulating a ship's screw propeller having adjustable blades and an engine driving said propeller, comprising in combination, a pitch-varying mechanism for adjusting the position of said propeller blades, a governing means controlling the speed of said engine, a first adjustment member comprising a substantially roller-shaped rotatable and axially displaceable curve body the circumferential surface of which forms a plurality of curve paths eccentric to the axis of rotation of said body, a first motion transmitting device engaging the circumference of said curve body and adapted to actuate said pitch-varying mechanism, a second adjustment member comprising a second substantially roller-shaped rotatable and axially displaceable curve body the circumferential surface of which forms a plurality of curve paths eccentric to the axis of rotation of said second curve body, a second motion transmitting device engaging the circumferential surface of said second curve body and adapted to actuate said governing means, means for displacing said first and second curve bodies axially, a first operating device, means operatively connecting said operating device to said first adjustment member so as to transmit rotary motion to said first curve body thereof, a second operating device, means operatively connecting said second operating device to said second adjustment member so as to transmit rotary motion to said second curve body thereof, whereby said adjustment members may be operated separately by means of said first and second operating devices, and means for connecting said operating devices to one another so as to cause them to move in unison, whereby said adjustment members may be operated simultaneously by means of either of said operating devices.

2. Means for regulating a ship's screw propeller having adjustable blades and an engine driving said propeller, as defined in claim 1, wherein each curve body is provided with at least one curve path adapted for separate operation of such curve body independently of the other curve body.

3. A marine variable-pitch screw propeller and a driving and control system therefor, comprising a pitch-varying mechanism connected to said propeller blades for effecting adjustment of the pitch of said blades, an engine for driving said propeller, an adjustable centrifugal speed governor controlling the speed of said engine by controlling the supply of motive fluid thereto, and a combined propeller pitch and engine speed control comprising a first movable adjustment means positively actuating said pitch-varying mechanism in accordance with a predetermined control characteristic, a second movable adjustment means positively actuating said centrifugal governor in accordance with a second predetermined control characteristic, a manually movable operating device, and means connecting said operating device to each of said first and second adjustment means to transmit motion thereto, whereby said first and second adjustment means may be operated simultaneously to different settings by said operating device, and whereby for any given setting, the engine speed and propeller pitch remains substantially constant under different conditions of the sea.

4. The driving and control system of claim 3 wherein at least one of said first and second adjustment means is regulatable to positively actuate its associated mechanism in accordance with any of a plurality of predetermined controlled characteristics, and means for effecting such regulation of said adjustment means.

5. The driving and control system of claim 3 which includes a first motion transmitting device interposed between said first adjustment means and said pitch-varying mechanism and a second motion transmitting device interposed between said second adjustment means and said centrifugal speed governor.

6. The driving and control system of claim 5 in which said first and second adjustment means are substantially roller-shaped rotatable curve bodies the circumferential surfaces of each of which form a plurality of different curve paths eccentric to the axis of rotation of said curve body.

7. The driving and control system of claim 5 in which at least one of said first and second transmitting devices includes an auxiliary operating device and means connecting said auxiliary operating device to the transmitting device whereby separate operation of the transmitting device may be effected.

8. The driving and control system of claim 5, which includes a first auxiliary operating device connected to said first motion transmitting device whereby separate operation of said first motion transmitting device may be effected and a second auxiliary operating device connected to said second motion transmitting device whereby separate operation of said second motion transmitting device may be effected.

9. The driving and control system of claim 8 which includes at least one resilient connection device inserted in one of said first and second motion transmitting devices between the corresponding auxiliary operating device and the corresponding adjustment means.

10. The driving and control system of claim 9 which includes a first resilient connection device inserted in said first motion transmitting device between said first auxiliary operating device and said first adjustment means and a second resilient connection device inserted in said second motion transmitting device between said second auxiliary operating device and said second adjustment means.

11. The driving and control system of claim 5 in which said first adjustment means comprises a first substantially roller-shaped rotatable curve body the circumferential surface of which forms a plurality of different curve paths eccentric to the axis of rotation of said body and in which said second adjustment means comprises a second rotatable curve body the circumferential surface of which forms a plurality of different curve paths eccentric to the axis of rotation of said second body, and including a shaft upon which at least one of said curve bodies is axially displaceable and means for displacing at least one of said curve bodies axially on said shaft.

12. The driving and control system of claim 11 including an auxiliary operating device connected to said second motion transmitting device whereby separate operation of said second motion transmitting device may be effected and a resilient connection device inserted in said second motion transmitting device between said auxiliary operating device and said second rotatable curve body.

JOHN ELOV ENGLESSON.

REFERENCES CITED

The following references are of record in the file of this patent:

UNITED STATES PATENTS

| Number | Name | Date |
|---|---|---|
| 617,633 | Brinkmann | Jan. 10, 1899 |
| 1,887,146 | Conkling | Nov. 8, 1932 |
| 1,944,242 | Johnson | Jan. 23, 1934 |
| 2,115,485 | Dodson | Apr. 26, 1938 |
| 2,179,492 | Caldwell et al. | Nov. 14, 1939 |
| 2,217,364 | Halford et al. | Oct. 8, 1940 |
| 2,322,303 | Martin | June 22, 1943 |
| 2,343,378 | Kieser | Mar. 7, 1944 |
| 2,396,618 | Stieglitz et al. | Mar. 12, 1946 |
| 2,423,191 | Kopp | July 1, 1947 |

FOREIGN PATENTS

| Number | Country | Date |
|---|---|---|
| 241,760 | Germany | Dec. 14, 1911 |

OTHER REFERENCES

Ser. No. 281,826, Stieglitz et al. (A. P. C.), publ. May 18, 1943.

Ser. No 303,551, Gosslau (A. P. C.), publ. May 18, 1943.